United States Patent
Marelas (10) Patent No.: US 10,586,052 B1
(45) Date of Patent: Mar. 10, 2020

(54) INPUT/OUTPUT (I/O) INSPECTION METHODS AND SYSTEMS TO DETECT AND DEFEND AGAINST CYBERSECURITY THREATS

(71) Applicant: EMC IP Holding Company LLC, Hopkinton, MA (US)

(72) Inventor: Peter Marelas, Melbourne (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 15/724,814

(22) Filed: Oct. 4, 2017

(51) Int. Cl.
*G06F 21/57* (2013.01)
*G06F 3/06* (2006.01)
*G06F 21/62* (2013.01)
*G06F 21/78* (2013.01)

(52) U.S. Cl.
CPC .......... *G06F 21/577* (2013.01); *G06F 3/0622* (2013.01); *G06F 3/0656* (2013.01); *G06F 3/0673* (2013.01); *G06F 21/6245* (2013.01); *G06F 21/78* (2013.01); *G06F 2221/034* (2013.01)

(58) Field of Classification Search
CPC .. G06F 21/577; G06F 3/0673; G06F 21/6245; G06F 3/0656; G06F 3/0622; G06F 2221/034; G06F 21/78
See application file for complete search history.

(56) References Cited

U.S. PATENT DOCUMENTS

| | | | |
|---|---|---|---|
| 2004/0093389 A1* | 5/2004 | Mohamed | H04L 67/1097 709/212 |
| 2006/0184785 A1* | 8/2006 | Challener | G06F 21/606 713/151 |
| 2006/0277539 A1* | 12/2006 | Amarasinghe | G06F 21/53 717/168 |
| 2010/0030986 A1* | 2/2010 | Shinozaki | G06F 3/0613 711/162 |
| 2012/0255010 A1* | 10/2012 | Sallam | G06F 21/572 726/24 |
| 2016/0050189 A1* | 2/2016 | Stute | H04L 63/0442 713/161 |
| 2016/0080148 A1* | 3/2016 | Kawarasaki | G06F 21/62 713/193 |
| 2016/0306578 A1* | 10/2016 | Drzewiecki | G06F 13/1663 |
| 2017/0026171 A1* | 1/2017 | Lal | H04L 9/0618 |

* cited by examiner

*Primary Examiner* — Cheng-Feng Huang
(74) *Attorney, Agent, or Firm* — Womble Bond Dickinson (US) LLP (57) ABSTRACT

Input/output (I/O) inspection methods and systems are disclosed to detect and defend against cybersecurity threats. In one example, a method includes intercepting input/output (I/O) operations including I/O write operations for a storage system. Segments of data related to the intercepted write I/O operations are stored in a write I/O buffer. One or more levels of inspection are performed on the segments of data stored in the write I/O buffer to detect a security threat. A protection instruction is injected in any segments of data having a detected security threat. The defensive action can be performed for the injected protection instruction prior to storing segments of data in the write I/O buffer in the storage system. The protection instruction can be injected at the head of the segments of data having a detected security threat.

12 Claims, 5 Drawing Sheets

INPUT/OUTPUT (I/O) INSPECTION METHODS AND SYSTEMS TO DETECT AND DEFEND AGAINST CYBERSECURITY THREATS

FIELD

Examples and embodiments of the invention are in the field of data processing and storage systems including related cybersecurity. More particularly, examples of the invention relate to input/output (I/O) inspection methods and systems to detect and defend against cybersecurity threats.

BACKGROUND

Cybersecurity threats are a major issue for computing systems handling and managing large amounts of sensitive and private data. Cybersecurity threats can include many types of malicious software such as ransomware which is a type of software designed to block access to a computer until a payment is made. Other threats can include system query language (SQL) injections which is malicious code inserted into SQL statements to dump contents of a database to a cyber attacker. Such threats fundamentally seek to comprise systems and data stored on them. Protection of cybersecurity threats to storage systems have been limited such as relying on high level whitelists (i.e., access control lists) that trust users with certain level of credentials and authentication to access storage systems and underlying data. This type of security is basic, which does not provide advanced intelligence or analysis on the malicious software or code to adequately defend against cybersecurity threats that face users of storage systems.

SUMMARY

Input/output (I/O) inspection methods and systems are disclosed to detect and defend against cybersecurity threats. According to one example, a method includes intercepting input/output (I/O) operations including I/O write operations for a storage system. Segments of data related to the intercepted write I/O operations are stored in a write I/O buffer. One or more levels of inspection are performed on the segments of data stored in the write I/O buffer to detect a security threat. A protection instruction is injected in any segments of data having a detected security threat.

According to one example, the defensive action can be performed for the injected protection instruction prior to storing segments of data in the write I/O buffer in the storage system. Examples of defensive action can include taking a point-in-time snap shot of the segments of data, breaking a replication relationship for the segments of data, creating a gap for the segments of data, throttling an I/O operation for the segments of data, duplicating an I/O operation for the segments of data, or halting I/O operations for the segments of data. The segments of data having a detected security threat from the write I/O buffer can be stored in the storage system after the defensive action is performed. The protection instruction can be injected at the head of the segments of data having a detected security threat.

Other I/O inspection methods, systems, and computer-readable mediums to detect and defend against cybersecurity threats are described.

BRIEF DESCRIPTION OF THE DRAWINGS

The present invention will be understood more fully from the detailed description given below and from the accompanying drawings of various examples and examples which, however, should not be taken to the limit the invention to the specific examples and examples, but are for explanation and understanding only.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, it is understood that examples and embodiments disclosed herein may be practiced without these specific details. In certain instances, well-known or conventional details, such as circuits, structures, and techniques, are not described in order to provide a concise discussion of example embodiments.

Reference in the specification to "example" or "embodiment" means that a particular feature, structure, or characteristic described in conjunction with the embodiment can be included in at least one embodiment. The appearances of the phrase "in one example" or "in one embodiment" in various places in the specification do not necessarily all refer to the same example or embodiment. Additionally, in the following description, reference to "coupled" and "connected," along with their derivatives, may be used. It should be understood that these terms are not intended as synonyms for each other. "Coupled" is used to indicated two or more elements, which may or may not be in direct physical or electrical contact with each other, co-operate or interact with each other. "Connected" is used to indicate establishment of communication between two or more elements that are coupled with each other.

In the following examples and embodiments, an input/output (I/O) storage system or storage system can include any type of persistent storage devices. Examples of persistent storage devices can include hard disk drives (HDD), tape drives, solid state drives (SSD), and storage area networks (SAN) including redundant array of independent disks (RAID) systems. The I/O inspection techniques disclosed herein can be implemented on any type of computer, data processing system, or storage system such as a server, standalone computer, laptop computer, tablet computer, or mobile computing device coupled or connected to storage units or devices having one or more processors. Such techniques can be implemented in hardware and/or software or a combination of both including non-transitory computer-readable or computer-storage mediums having instructions which can be executed by one or more computers or computing systems.

As described herein, real-time I/O inspection methods and systems are disclosed to detect and defend against cybersecurity threats in the I/O path of storage systems without incurring data loss. For one example, a computer-implemented method includes intercepting input/output (I/O) operations including I/O write operations for a storage system. Segments of data related to the intercepted write I/O operations are stored in a write I/O buffer. One or more levels of inspection are performed on the segments of data stored in the write I/O buffer to detect a security threat. A protection instruction is injected in any segments of data having a detected security threat.

For one example, the defensive action can be performed for the injected protection instruction prior to storing segments of data in the write I/O buffer in the storage system. Examples of defensive action can include taking as point-in-time snap shot of the segments of data, breaking a replication relationship for the segments of data, creating a gap for the segments of data, throttling an I/O operation for the segments of data, duplicating an I/O operation for the segments of data, or halting I/O operations for the segments of data. The segments of data having a detected security threat from the write I/O buffer can be stored in the storage system after the defensive action is performed. The protection instruction can be injected at the head of the segments of data having a detected security threat. Such threat detection and protection techniques can be implemented for I/O operations for persistent storage devices such as, e.g., flash and non-volatile memory devices.

Figure 1:
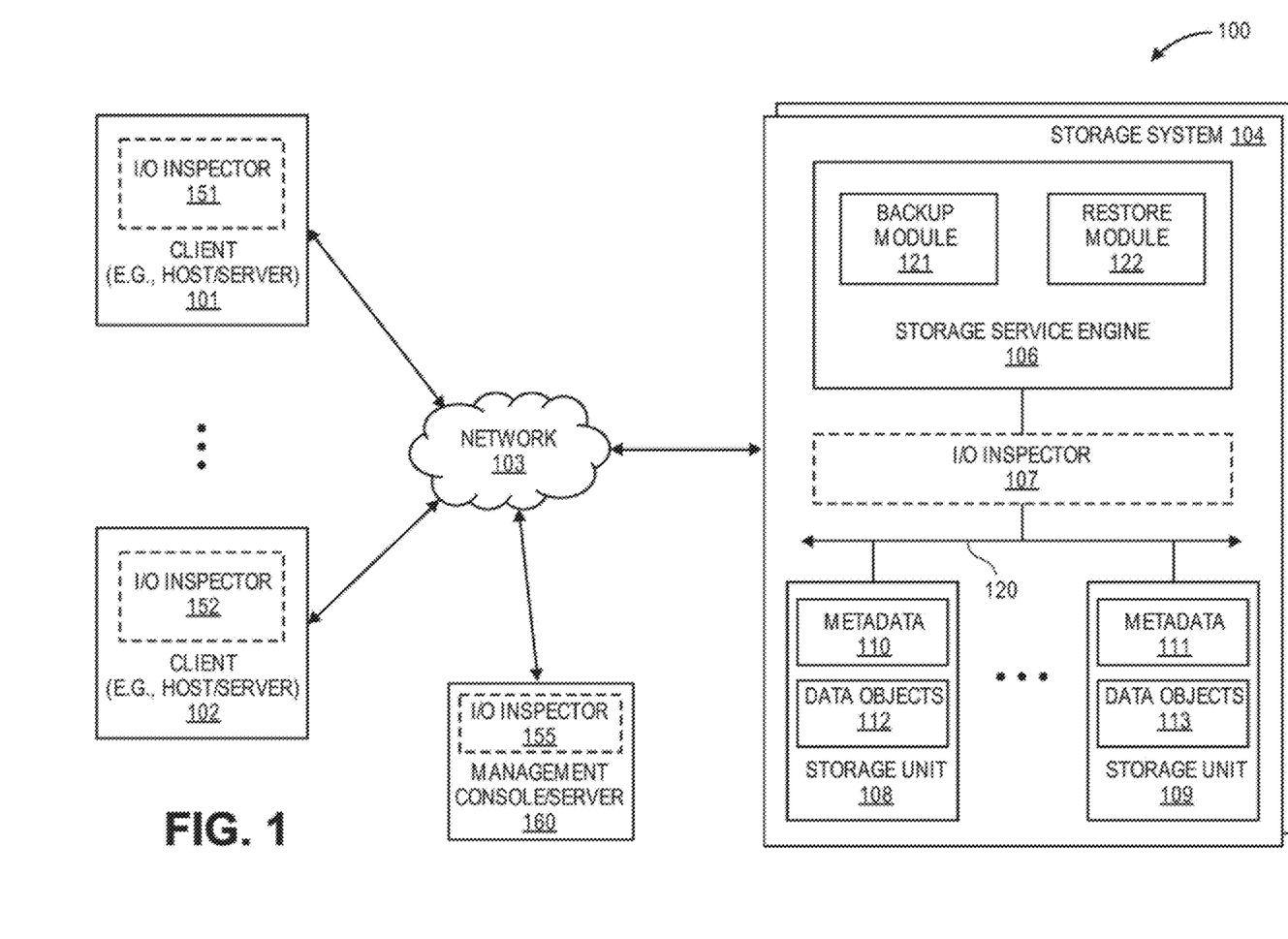
FIG. 1 is one example block diagram of a system of interconnected computing devices and storage system having I/O inspectors to detect and defend against cybersecurity threats to the storage system.

FIG. 1 is one example block diagram of a system 100 of computing devices 101-102, and 160 interconnected to storage system 104 by way of network 103 having I/O inspectors 107 and 151-153 to detect and defend against cybersecurity threats to storage system 104. Referring to FIG. 1, the computing devices (or computers) of system 100 can include one or more clients 101-102, and management/console server 160. These computers can be communicatively coupled to storage system 104 over network 103. For one example, clients 101-102 can be any type of client such as a host or server, a personal computer (e.g., desktops, laptops, and tablets), a "thin" client, a personal digital assistant (PDA), a Web enabled appliance, or a mobile phone (e.g., Smartphone), and etc. For other examples, any of clients 101-102 can be a primary storage system (e.g., local data center) that provides storage to other local clients, which may periodically back up the content stored therein to a backup storage system (e.g., a disaster recovery site or system), such as storage system 104.

For one example, network 103 can be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102. For one example, storage system 104 can include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data).

For one example, storage system 104 can provide storage services to clients or users via a variety of access interfaces and/or protocols such as file-based access protocols and block-based access protocols. The file-based access protocols can include the network file system (NFS) protocol, common Internet the system (CIFS) protocol, and direct access file system protocol, and etc. The block-based access protocols can include the small computer system interface (SCSI) protocols, Internet SCSI or iSCSI, and Fibre channel (FC) protocol, and etc. Storage system 104 can further provide storage services via an object-based protocol and Hadoop distributed file system (HDFS) protocol.

For one example, storage system 104 includes storage service engine 106 (also referred to as service logic, service module, or service unit, which may be implemented in software, hardware, or a combination thereof), I/O inspector 107, and one or More storage units or devices 108-109, which can be communicatively coupled to each other. Storage service engine 106 may, represent any storage service related components configured or adapted to provide storage services (e.g., storage as a service) to a variety of clients using any of the access protocols set forth above. For example, storage service engine 106 may include backup logic 121 and restore logic 122. Backup logic 121 can be configured to receive and back up data from a client (e.g., clients 101 and 102) and to store the backup data in any one or more of storage units 108 and 109. Restore logic 122 can be configured to retrieve and restore backup data from any one or more of storage units 108-109 back to a client (e.g., clients 101-102).

For one example, storage units 108-109 can be implemented locally (e.g., single node operating environment) or remotely (e.g., multi-node operating environment) via interconnect 120, which may be a bus and/or a network (e.g., a storage network or a network similar to network 103). Storage units 108-109 can include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

For one example, in response to an I/O write operation, e.g., storing data or a data file in storage units 108-109, I/O inspector 107 can be configured to intercept the data destined for storage units 108-109 and store the intercepted data in a persistent buffer. The buffer can be comprise of a number of segments. I/O inspector 107 can implement one or more levels of inspection on the data stored in the segments to detect a cybersecurity threat. In one example, if a threat is detected a protection instruction or information can be injected into the data to identify, signal, or protect against the detected threat as disclosed in the following examples and embodiments. For one example, each of the clients 101-102 and management console server 160 can have its own I/O inspector 151-152 and 155 to intercept I/O data destined for storage system 104 and to inject protection instruction in the data before it is written or stored M storage units 108-109. For example, the protection instructions or information can be stored in data objects 112-113 storage system 104 if a threat is detected in the data.

For one example, storage service engine 104 can also segment a data file into multiple segments (also referred to as chunks) according to a variety of segmentation policies or rules and implement deduplication operations so as not to store a segment in a storage unit if the segment has been previously stored in the storage unit. In such an event, storage service engine 104 can store metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files or data objects 112-113 it contains.

Figure 2:
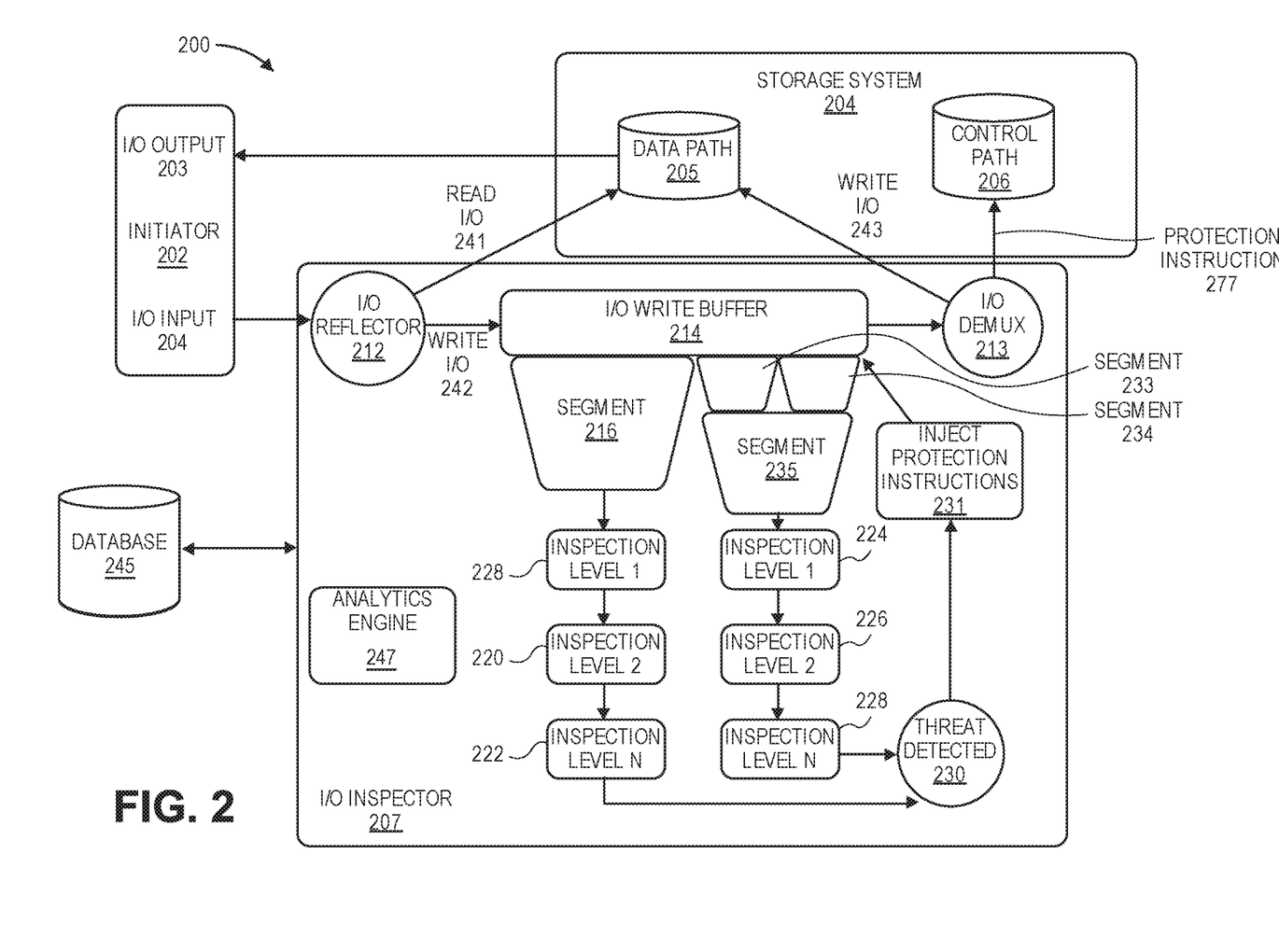
FIG. 2 is one example block diagram of an I/O inspector system.

FIG. 2 is one example block diagram of an I/O inspector system 200. System 200 can be a real-time IO inspection system to detect and defend against cybersecurity threats in the I/O path with storage system 204 without incurring data loss. In one example, system 200 includes I/O inspector 207 which can be embedded or standalone hardware and/or software or a combination of both configured to intercept read and write I/O operations for storage system 204. For example, I/O inspector 207, is one embodiment, take the form of hardware or software including firmware, resident software, micro-code, etc. In other embodiments, I/O inspector 207 can be a combination of hardware and software as a circuit, module, engine, or system including non-transitory computer-readable medium or storage devices having computer readable code to implement the techniques in the following examples and embodiments. System 200, in one example, can be implemented for I/O inspectors 151-152, 155 or 107 of FIG. 1.

Referring to FIG. 2, system 200 includes an initiator 202 having an I/O output 203 and I/O input 204 coupled with I/O inspector 207 and storage system 204 having a data path 205 to and from storage units and a control path 206. In one example, initiator 202 and I/O inspector 207 can be implemented in an application layer such as the I/O stack layer. Examples of I/O stack layers where initiator 202 and I/O inspector 207 can be implemented include a host I/O stack, host volume manager, host I/O controller, storage area network (SAN) I/O controller, SAN port, storage array controller, or any, other interface to a storage system or one or more storage devices. Storage system 204 can include storage units having persistent storage and can be implemented in any type of storage device or system including consumer devices such as portable hard drives, laptop computers, tablet computers, mobile phones, smartphones, cloud drivers or Universal Serial Bus (USB) drives, etc. In one example, initiator 202 and I/O inspector can be a standalone appliance operating within such devices or software embedded in the devices.

For one example, I/O output 203 of initiator 204 can receive data (or files) from storage system 204 by way of data path 205, e.g., for a read operation. Initiator 203 can read the data from storage system 204 to determine if a protection instruction is included in the data that was inserted by I/O inspector 207 to signal a threat. In one example, the protection instruction can provide protection code to take defensive actions, and, in other examples, protection instruction can be implemented on the write I/O path that detected a threat and implement preventive measures as described herein. For one example, I/O input 204 of initiator 204 can receive an I/O read or write operation including data (or files) from an application for storage system 204. I/O input 204 sends the I/O operation including data to I/O reflector 212 that intercepts the I/O operation and data to storage system 204.

For one example, I/O) reflector 212 sends a read I/O operation 241 to storage system 204 by way of data path 205 for reading of data from storage system 204. I/O reflector 212 can also send a write I/O operation 243 to I/O write buffer 214. Read ISO operation 241 and write I/O operation 243 can occur at the same time in I/O processing stream to storage system 204, In one example, to prevent adverse impact on I/O performance, I/O reflector 212 can pass a copy of I/O read operations to I/O inspector 207 and storage system 204, which allows I/O inspector 207 read I/O read operations for inspection while avoiding to service the read I/O operations. In one example, I/O write buffer 214 can be a persistent buffer and include a number of locations having a length N, which can be divided into segments, e.g., segments 216, 233, 234, and 235, having predetermined length M or varying segment lengths. The size of the segments can be based on size of I/O write data or speed and time of data transfer.

For one example, as data in segments 216, 233, 234, and 235 of write buffer 214, I/O inspector 207 can implement or run one or more levels of inspections (inspection level 1 through inspection level N) on the data in the segments to detect and identify security threats or I/O anomalies. I/O inspector 207 can apply one of the levels of inspection all of them depending on importance level of data or threat level. For example, I/O inspector 207 apply one level of inspection for data from a low value data source or apply multiple levels of inspection for data from a high value data source. In other examples, I/O inspector 207 may implement additional levels of inspection or increase the level of inspection if a certain threat level is detected or identified. In one example, I/O inspector can apply signature based or behavior based analysis on the data in I/O write buffer 214 to detect threats. In some examples, I/O inspector 207 can apply levels of inspection on one segment (e.g., segment 217) while applying levels of inspection on other segments of varying sizes (e.g., segments 133, 234 and 235).

For one example, I/O inspector 207 can use any number of security detection techniques and algorithms to detect cybersecurity security threats or ransomware. One technique can include use of static rules or dynamic rules in determining whether certain types of data in data segments can be identified as a threat. Another technique can use pattern recognition which can examine certain signatures or bit patterns in the data which have been identified as data security threats. Another technique I/O inspector 207 can use include Markov chain which is a stochastic process in which an outcome at any stage depends on some probability—i.e., inspector 207 can use a probability function to determine if certain patterns of data in the segments can be considered a threat. Supervised or unsupervised machine learning (ML) models or deep neural networks (DNNs) and algorithms can also be used to determine if certain types of data patterns can be determined as security threats in the data segments. These models can be pre-trained off-line and loaded by I/O inspector 207 or learned from initiator 202 analyzing I/O usage patterns and having I/O inspector 207 in learning mode for a period of time to establish a model of storage system 204 environment. The techniques and algorithms can be applied to both metadata that can describe I/O patterns including I/O data payloads.

For one example, I/O inspector 207 includes analytics engine 247 which can implement inspection, e.g., inspection levels 1 through N, to detect threats in the data segments of I/O write buffer 214. In one example, I/O inspector 207 can be coupled with database 245 which can store I/O history and machine learning (ML) models to implement security techniques and inspection in determining threats in the data. In other examples, database 245 can be embedded as part of inspector 207, or can be external to I/O inspector 207 as a standalone system, or external and delivered as a cloud service. In the example of a cloud service, I/O patterns learned or trained can be combined based on unrelated storage systems operating at different sites for different users. In this way, threats detected in one environment can be applied to other environments thus forming an providing a crowd-sourced model, in one example, for I/O threat detection.

For one example, if threat detected operation 230 detects a threat, I/O inspector 207 can perform inject protection instructions operation 231 into the segments of the I/O write buffer 214. For example, I/O inspector 207 for the inject protections instructions operation 231 can insert or inject a protection instruction at the head of the segment which was identified as having a threat detected (e.g., segments 216, 233-235), In one example, I/O de-multiplexer 213 (I/O) demux) can process data segments from I/O write buffer 214 including any protection instructions injected in the data segments to ensure that control path 206 of storage system 204 carries out or executes any protection instructions. For example, control path 206 within storage system 204 can implement or execute protection instructions prior to receiving segments from I/O write buffer 214 and storing segments in data storage units or devices. Control path 206 can take defensive actions for any detected threat prior to storing any segments in persistent storage within data storage system 204 based on the protection instructions.

Figure 3:
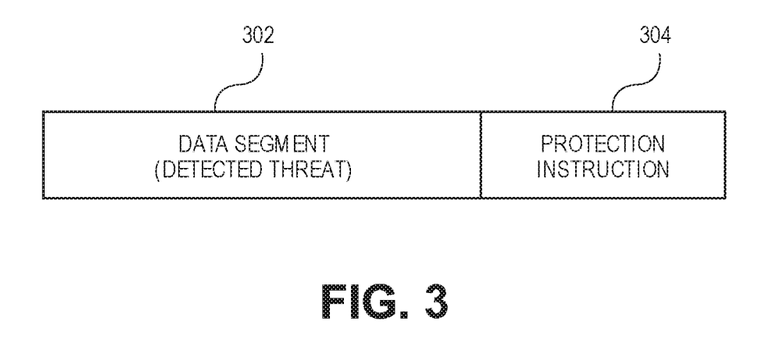
FIG. 3 is one example block diagram of a protection instruction at the head of a data segment stored in an I/O write buffer of FIG. 2.

FIG. 3 is one example of a protection instruction 304 at the head of a data segment 302 stored in I/O write buffer 214 of FIG. 2. For one example, protection instruction 304 includes a signal, which precedes data segment 302 and can represent segments 216 or 233-235 of FIG. 2, having instructions for control path of storage system 204 to take defensive action for segment 302. Examples of defensive actions provided in protection instruction 304 can include instructions for taking a point-in-time snap shot of the data in segment 302, creating a bookmark for segment 302 that identifies that the segment has a detected threat, breaking a replication relationship for segment 302 creating a gap by having a switch or network port go offline, throttling I/O operations to the storage system 204, duplicating an I/O operation related to segment 302 to a honeypot device, halting I/O operations to storage system 204, or taking any combination of defensive actions.

Figure 4:
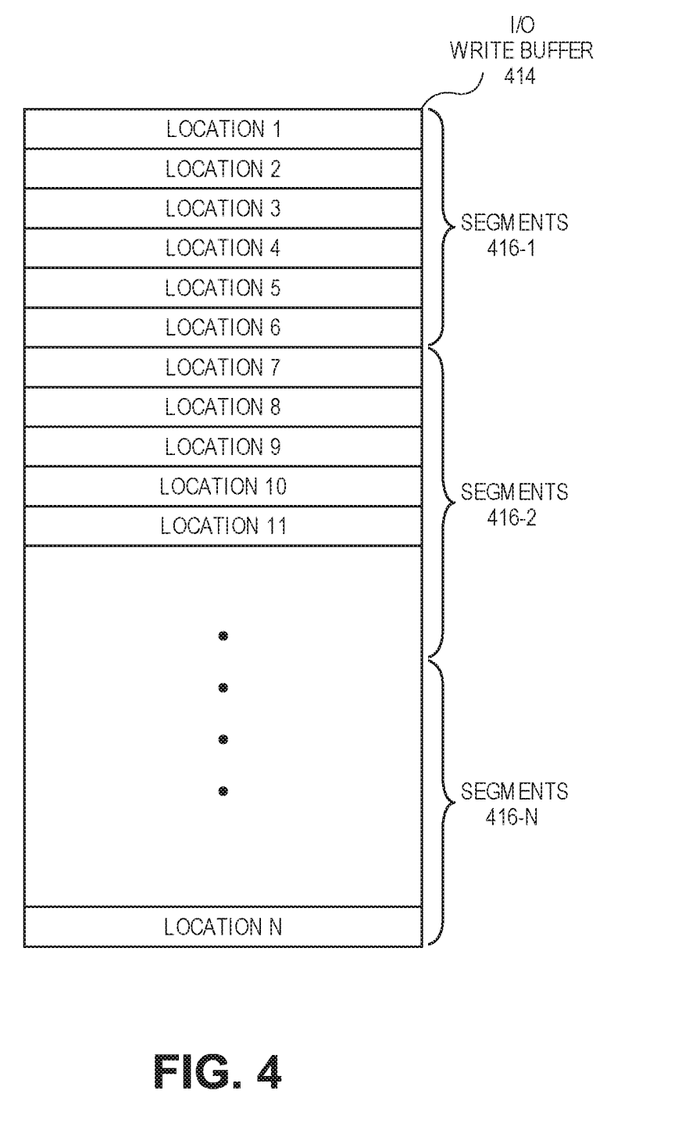
FIG. 4 is one example block diagram of an I/O write buffer which can be used for the I/O inspector system of FIG. 2.

FIG. 4 is one example block diagram of an I/O write buffer 414 which can be used for the I/O inspector system 200 of FIG. 2. For one example, I/O write buffer 414 can be a persistent storage device such as a flash or non-volatile memory device to prevent impacting I/O operations for a storage system. In one example, I/O write buffer 414 includes a plurality a buffer locations (locations 1 through N). The locations 1 through N can be divided into a plurality of segments 316-1 through 316-N storing data for an I/O operation. In one example, if a data segment, e.g., segment 416-1, is detected with a security threat, a protection instruction can be injected at the head of segment 416-1 at location 11 or above. In one example, as data from segments 416-1 through 416-N are inspected, the data segments can pass from I/O write buffer 414 making room for other data segments for I/O operations.

Figure 5:
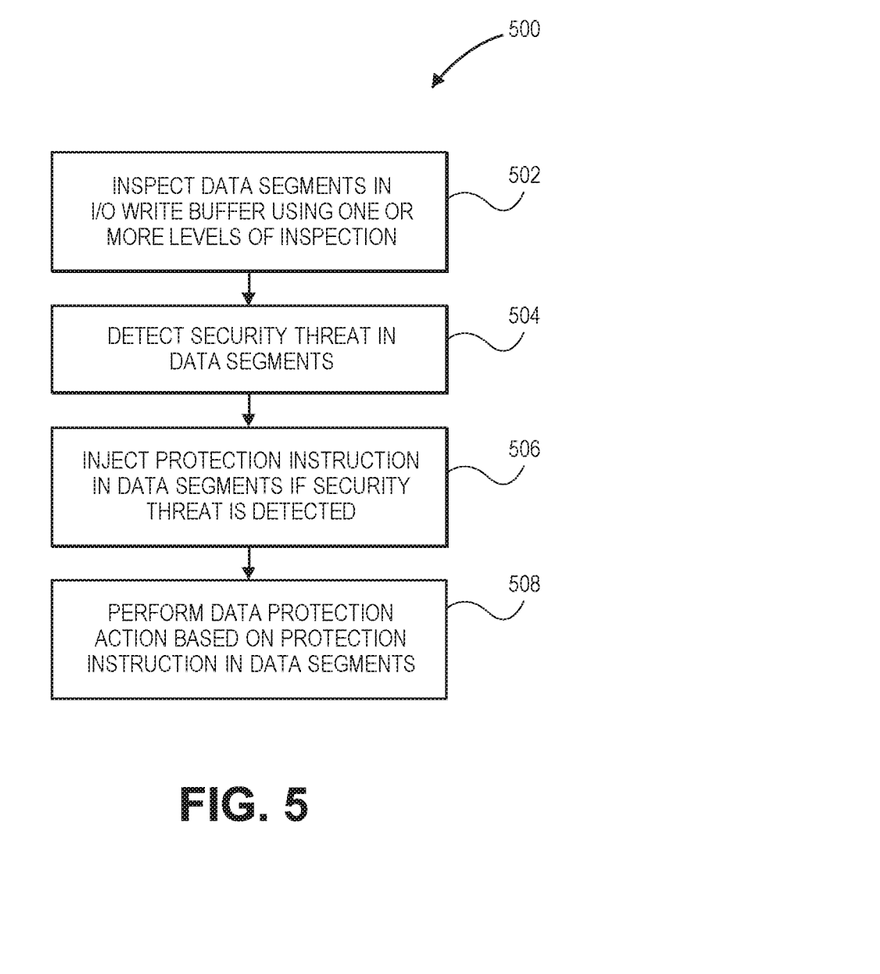
FIG. 5 is one example flow diagram of an operation to protect against security threats in data segments for I/O operations of a storage system.

FIG. 5 is one example flow diagram of an operation 500 to protect against security threats in data segments for I/O operations of a storage system. At operation 502, segments in an I/O write buffer e.g., I/O write buffer 214) are inspected using one or more levels of inspection. For example, I/O inspector 207 can inspect segments in I/O write buffer 214 for security threats using multiple levels of inspection or a single level of inspection. At operation 504, I/O inspector detects security threads in the segments of data in I/O write buffer 214 (e.g., segments 216 or 233-235, or segments 416-1 to 416-N). At operation 506, a protection instruction e.g., protection instruction 304) is injected at the head of data segments having detected security threats. At operation SOS, one or more defensive actions are performed if a protection instruction is injected in data segments having security threats prior to storing the data segments in a storage system.

In the foregoing specification, specific examples and exemplary embodiments have been disclosed and described. It will be evident that various modifications may be made to those examples and embodiments without departing from the broader spirit and scope set forth in the following claims. The specification and drawings are, accordingly, to be regarded in an illustrative sense rather than a restrictive sense.

What is claimed is:

1. A computer-implemented method comprising:
intercepting one or more input/output (I/O) operations including write I/O operations for a storage system;
storing segments of data related to the intercepted write I/O operations in a write I/O buffer;
performing one or more levels of inspection on each segment of data stored in the write I/O buffer to detect a security threat, the number of inspection levels performed on each segment based, at least in part, on a size of the segment and wherein each level of inspection comprises a technique for detecting a security threat;
injecting a protection instruction in any segments of data having a detected security threat; and
performing a defensive action for the injected protection instruction prior to storing segments of data in the write I/O buffer in the storage system, wherein performing the defensive action comprises taking a point-in-time snap shot of the segments of data, breaking a replication relationship for the segments of data, creating a gap for the segments of data, throttling an I/O operation for the segments of data, duplicating an I/O operation for the segments of data, or halting I/O operations for the segments of data.

2. The computer-implemented method of claim 1, further comprising:
storing the segments of data having a detected security threat from the write I/O buffer after the defensive action is performed.

3. The computer-implemented method of claim 1, wherein injecting the protection instruction includes injecting the protection instruction at the head of the segments of data having a detected security threat.

4. A data processing system comprising:
a storage system having one or more persistent storage units to store data; and
an input/output (I/O) inspector coupled to the storage system including an I/O write buffer, the I/O inspector to intercept I/O operations including I/O write operations for the storage system, store segments of data related to the intercepted write I/O operations in a write I/O buffer, perform one or more levels of inspection on each segment of data stored in the write I/O buffer to detect a security threat, the number of inspection levels performed on each segment based, at least in part, on a size of the segment, wherein each level of inspection comprises a technique for detecting a security threat, and inject a protection instruction in any segments of data having a detected security threat, and perform a defensive action for the injected protection instruction prior to storing segments of data in the write I/O buffer in the storage system, wherein performing the defensive action comprises taking a point-in-time snap shot of the segments of data, breaking a replication relationship for the segments of data, creating a gap for the segments of data, throttling an I/O operation for the segments of data, duplicating an I/O operation for the segments of data, or halting I/O operations for the segments of data.

5. The data processing system of claim 4, wherein the I/O inspector stores the segments of data having a detected security threat from the write I/O buffer in the storage system after the defensive action is performed.

6. The data processing system of claim 4, wherein the I/O inspector injects the protection instruction at the head of the segments of data in the write I/O buffer having a detected security threat.

7. A non-transitory computer-readable medium, including instructions, which if executed by one or more computers, cause the computers to perform an operation comprising:
    intercepting input/output (I/O) operations including I/O write operations for a storage system;
    storing segments of data related to the intercepted write I/O operations in a write I/O buffer;
    performing one or more levels of inspection on each segment of data stored in the write I/O buffer to detect a security threat, the number of inspection levels performed on each segment based, at least in part, on a size of the segment, and wherein each level of inspection comprises a technique for detecting a security threat;
    injecting a protection instruction in any segments of data having a detected security threat; and
    performing a defensive action for the injected protection instruction prior to storing segments of data in the write I/O buffer in the storage system, wherein performing the defensive action comprises taking a point-in-time snap shot of the segments of data, breaking a replication relationship for the segments of data, creating a gap for the segments of data, throttling an I/O operation for the segments of data, duplicating an I/O operation for the segments of data, or halting I/O operations for the segments of data.

8. The non-transitory computer-readable medium of claim 7, including instructions, which if executed by the one or more computers, cause the computers to perform an operation comprising:
    storing the segments of data having a detected security threat from the write I/O buffer after the defensive action is performed.

9. The non-transitory computer-readable medium of claim 7, including instructions, which if executed by the one or more computers, cause the computers to perform an operation comprising:
    injecting the protection instruction at the head of the segments of data having a detected security threat.

10. A computing system comprising:
    an I/O write buffer storing segments of data for an I/O write operation to a storage system;
    a processor coupled to the I/O write buffer and configured to intercept an I/O operation including an I/O write operation to the storage system, store segments of data related to the intercepted I/O write operation in the write I/O buffer, perform one or more levels of inspection on each segment of data stored in the write I/O buffer to detect a security threat, the number of inspection levels performed on each segment based, at least in part, on a size of the segment, wherein each level of inspection comprises a technique for detecting a security threat, inject a protection instruction in any segments of data having a detected security threat, and perform a defensive action for the injected protection instruction prior to storing segments of data in the write I/O buffer in the storage system, wherein performing the defensive action comprises taking a point-in-time snap shot of the segments of data, breaking a replication relationship for the segments of data, creating a gap for the segments of data, throttling an I/O operation for the segments of data, duplicating an I/O operation for the segments of data, or halting I/O operations for the segments of data.

11. The computing system of claim 10, wherein the processor is configured to store the segments of data having a detected security threat from the write I/O buffer after the defensive action is performed.

12. The computing system of claim 10, wherein the processor is to inject the protection instruction at the head of the segments of data having a detected security threat.

* * * * *